Oct. 26, 1965  C. H. FORSYTH ETAL  3,213,812
FURROW OPENER

Filed March 2, 1964  2 Sheets-Sheet 1

Inventors:
Clark H. Forsyth
Dennis W. Walker
By
Atty.

Oct. 26, 1965  C. H. FORSYTH ETAL  3,213,812
FURROW OPENER
Filed March 2, 1964  2 Sheets-Sheet 2
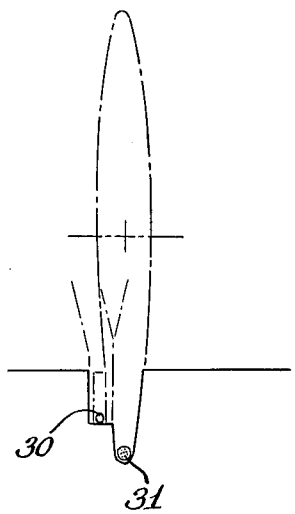
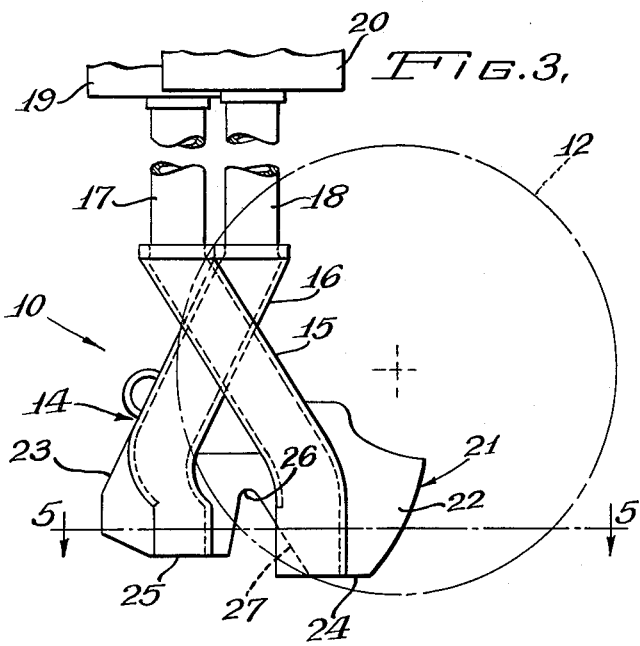
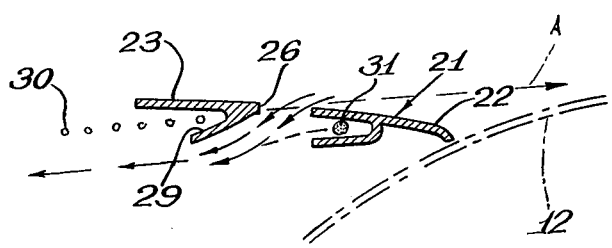
Inventors:
Clark H. Forsyth
Dennis W. Walker
By
J K McNeil
Atty.

United States Patent Office 3,213,812
Patented Oct. 26, 1965

3,213,812
FURROW OPENER
Clark H. Forsyth and Dennis W. Walker, Hamilton, Ontario, Canada, assignors to International Harvester Company, Chicago, Ill., a corporation of New Jersey
Filed Mar. 2, 1964, Ser. No. 348,741
2 Claims. (Cl. 111—80)

This invention relates to agricultural implements and particularly to planters. More specifically, the invention concerns novel furrow-forming means for planters and the like.

In agricultural apparatus for dispensing material to the ground, the practice of simultaneously depositing seed and fertilizer is well-known, as is the importance of avoiding injury to the seed by separating the fertilizer therefrom by a layer of earth. The principal difficulty encountered with previous apparatus for planting both seed and fertilizer has been in that of satisfactorily maintaining this separation.

An object of this invention, therefore, is the provision of an improved furrow opener for planters and the like.

Another object of the invention is the provision of improved means for depositing seed and fertilizer at locations in the ground separated by a wall of earth.

Another object of the invention is the provision of novel furrow opening and dispensing means for simultaneously depositing and efficiently separating seed and fertilizer and the like to avoid contamination of the seed.

Experimentation has shown that mere separation of fertilizer from seed is not enough, but optimum conditions for the germination of the seed and the availability of the fertilizer nutrients thereto are achieved if the fertilizer is not only separated from the seed but is deposited to one side thereof and at a lower depth. Therefore, another object of this invention is the provision of improved furrow-forming means not only insuring the separation of the fertilizer from the seed by a wall of earth but the deposition of the fertilizer to one side of the seed and at a lower depth.

Other objects and advantages of the invention will become clear in the following detailed description when read in conjunction with the accompanying drawings wherein:

FIGURE 3 is a diagrammatic side elevation showing a single disk furrow opener and boot combination having conduit or guide means incorporated therein for directing both seed and fertilizer into the furrow formed by the disk;

FIGURE 4 is a diagrammatic end view of a portion of the structure shown in FIGURE 3 showing the structure of the furrow in profile as formed by the furrow opener of this invention and illustrating the relative positions of the seed and fertilizer; and FIGURE 5 is a section taken along the line 5—5 of FIGURE 3.

Figure 1:
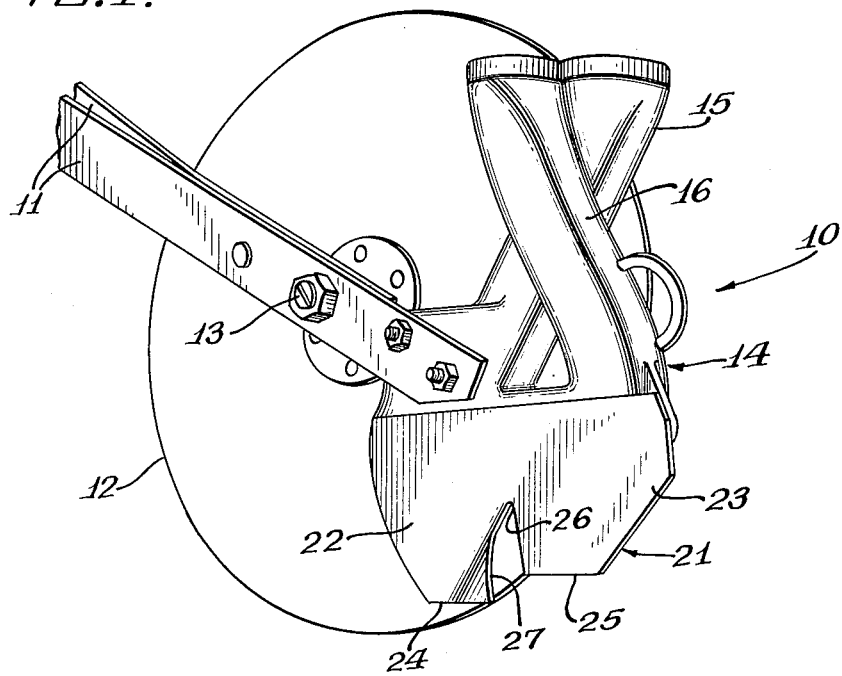
FIGURE 1 is a view in perspective of a single disk furrow opener incorporating the features of this invention.

It may be understood that the furrow opening apparatus of this invention is mounted on a conventional traveling frame of any well-known type adapted to be connected to a tractor to be propelled over the ground. The furrow opener unit is designated by the numeral 10 and comprises supporting apparatus in the form of a drag bar structure 11 upon which is rotatably mounted a disk 12 having its concave face directed outwardly and which is secured to the drag bar structure 11 by a bolt 13.

Also forming a part of the furrow opener unit 10 is a planter boot 14 secured to the end of the supporting member 11 adjacent the rear or convex side of disk 12 and including a guide conduit 15 for fertilizer or the like and another guide conduit 16 for seed, connected to preferably flexible tubes 17 and 18, respectively, having communication with fertilizer and seed dispensing hoppers 19 and 20, respectively.

Forming a part of boot 14 is a landside 21 in the form of a longitudinally extending plate arranged generally parallel to the direction of travel and to the furrow formed by the disk 12 but preferably at a slight angle thereto as indicated in FIGURE 5, and including a forward portion or section 22 disposed adjacent the lower portion of disk 12, and a rearward section 23. The direction of travel of the unit is indicated in FIGURE 5 and designated by the letter A.

Sections 22 and 23 are provided with lower earth-penetrating edges 24 and 25, respectively, and are separated by an opening in the form of a generally V-shaped notch 26.

As FIGURE 3 makes clear, the lower edge 24 of forward landside section 22 is vertically offset below the lower edge 25 of rearward landside section 23.

Figure 2:
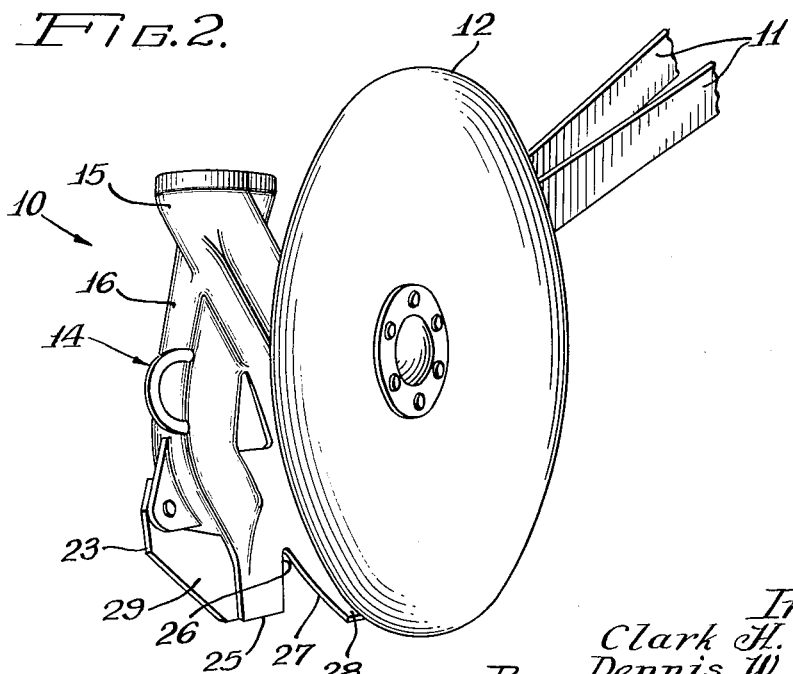
FIGURE 2 is another perspective view from a different position of the apparatus shown in FIGURE 1.

As will be clearly seen in FIGURES 1 and 2, the forward edge 27 of notch 26 is bent laterally and offset from rearward landside section 23 toward the convexed side of the disk adjacent the lower earth-penetrating edge thereof and forms therewith an outlet 28 for the discharge of fertilizer, received through guide tube 15, into the bottom of the furrow formed by the disk. Soil from the furrow during forward travel of the furrow opener unit is laterally diverted in the path of the arrows in FIGURE 5 through the opening 26, the lower portion of which faces forwardly. The fertilizer discharged through the outlet 28 is struck by the stream of soil coming through the opening 26 and is carried down therewith to the bottom of the furrow formed by the disk.

The lower edge 25 of the rearward landside portion 23 is disposed at a shallower depth than the lower edge 24 of forward landside portion 22, and seed passing through tube 16 from hopper 20 falls through a bifurcation 29 provided at the rear of the landside section 23 and is deposited upon an elevated shelf, the position of the seed being indicated at 30 in FIGURE 4, while the position of the fertilizer at the bottom of the deep part of the furrow is indicated at 31 in FIGURE 4.

Although not shown it should be understood, of course, that conventional covering devices well-known to those skilled in the art are mounted on the furrow opener unit rearwardly of the boot 14 to sweep soil over the entire furrow to cover both seed and fertilizer.

It is believed that the construction and operation of the novel furrow forming and seed depositing apparatus of this invention will be clearly understood from the foregoing description. It should likewise be understood that the invention has been described in its preferred embodiment only, and that modifications may be made therein without departing from the spirit of the invention or the scope of the appended claims.

What is claimed is:

1. A furrow opener assembly comprising a support, a disk rotatably mounted on the support arranged to open a furrow in the ground, a boot structure mounted on the support at one side of said disk, a landside forming part of said boot adapted to bear against the wall of the furrow formed by said disk, said landside having a vertical opening in the lower edge thereof forming a forward portion alongside said disk and a rearward portion extending rearwardly thereof and at a shallower depth than said disk, conduit means on the boot for directing fertilizer and the like between said forward portion and said disk, another conduit means on the boot for discharging seed in the path formed by said rearward portion, said forward portion of the landside being bent laterally away from the plane of said rearward portion and toward said one side of the disk to form an outlet between said forward portion and the disk for discharging said fertilizer and the like into the bottom of the furrow opened by said disk and said vertical opening being a forwardly facing opening between said forward and rearward portions of the landside to divert soil laterally therethrough and into the path of the fertilizer to cover the latter prior to the discharge of seed from said rearward portion.

2. The invention set forth in claim 1, wherein the lower edge of said rearward landside portion is vertically offset from and penetrates the ground in the furrow at a shallower depth than the lower edge of said forward landside portion.

References Cited by the Examiner

UNITED STATES PATENTS

| | | | |
|---|---|---|---|
| 1,229,194 | 6/17 | Patric | 111—86 X |
| 2,869,489 | 1/59 | Buhr | 111—80 |
| 2,920,587 | 1/60 | Shriver | 111—80 |

ABRAHAM G. STONE, *Primary Examiner.*

WILLIAM A. SMITH, III, *Examiner.*